(12) United States Patent  
Sutherland et al.

(10) Patent No.: US 9,944,150 B2  
(45) Date of Patent: Apr. 17, 2018

(54) HVAC SYSTEMS FOR ELECTRICALLY-POWERED VEHICLES

(71) Applicant: BORGWARNER INC., Auburn Hills, MI (US)

(72) Inventors: Andrew D. Sutherland, Birmingham, MI (US); Steven M. Myers, Oxford, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/729,989

(22) Filed: Jun. 3, 2015

(65) Prior Publication Data

US 2016/0355068 A1    Dec. 8, 2016

(51) Int. Cl.
| | |
|---|---|
| *B60H 1/00* | (2006.01) |
| *B60L 1/02* | (2006.01) |
| *B60L 1/00* | (2006.01) |
| *B60H 1/22* | (2006.01) |

(52) U.S. Cl.
CPC ..... *B60H 1/00492* (2013.01); *B60H 1/00392* (2013.01); *B60H 1/2225* (2013.01); *B60L 1/02* (2013.01); *B60L 1/20* (2013.01); *B60H 2001/229* (2013.01)

(58) Field of Classification Search
CPC ............................ B60H 1/005; B60H 1/00492
USPC ........................................................ 237/44
See application file for complete search history.

(56) References Cited

U.S. PATENT DOCUMENTS

| | | | | |
|---|---|---|---|---|
| 3,885,126 A | * | 5/1975 | Sugiyama | B60H 1/0025 126/400 |
| 4,678,982 A | * | 7/1987 | Offiler | B60L 1/02 219/202 |
| 5,256,857 A | * | 10/1993 | Curhan | F24H 3/0411 219/202 |
| 5,291,960 A | * | 3/1994 | Brandenburg | B60H 1/00492 123/41.14 |
| 5,471,034 A | * | 11/1995 | Kawate | B60H 1/2225 219/483 |
| 5,553,662 A | * | 9/1996 | Longardner | B60H 1/00492 165/10 |
| 5,901,572 A | * | 5/1999 | Peiffer | B60H 1/00 165/104.12 |
| 6,002,105 A | * | 12/1999 | Tamada | B60H 1/00064 219/202 |

(Continued)

FOREIGN PATENT DOCUMENTS

| | | |
|---|---|---|
| WO | WO 2011/058383 A2 | 5/2011 |
| WO | WO 2013/088190 A1 | 6/2013 |

*Primary Examiner* — Avinash Savani  
*Assistant Examiner* — Deepak Deean  
(74) *Attorney, Agent, or Firm* — Miller, Matthias & Hull LLP

(57) ABSTRACT

A heating, ventilation, and air-conditioning (HVAC) system for an electrically-powered vehicle (EV) having an electric motor powered by at least one battery is described. The HVAC system may comprise a blower, a conduit configured to carry air from the blower to vents leading to a passenger cabin of the EV, and an electric heater positioned in the conduit and configured to heat the air. The HVAC system may further comprise a thermal reservoir heater positioned in the conduit and including a thermal storage component configured to heat the air without using power from the battery.

18 Claims, 10 Drawing Sheets

(56) References Cited

U.S. PATENT DOCUMENTS

| | | | | |
|---|---|---|---|---|
| 6,059,016 | A * | 5/2000 | Rafalovich | B60H 1/00492 165/10 |
| 6,213,198 | B1 * | 4/2001 | Shikata | B60H 1/00478 165/202 |
| 6,554,088 | B2 * | 4/2003 | Severinsky | B60H 1/004 180/65.23 |
| 6,942,944 | B2 * | 9/2005 | Al-Hallaj | H01M 2/1094 429/120 |
| 7,024,986 | B2 * | 4/2006 | Kurosawa | A23L 7/187 99/323.5 |
| 9,447,994 | B2 * | 9/2016 | Barnhart | F25B 21/04 |
| 2002/0043068 | A1 * | 4/2002 | Carr | F24F 5/0017 62/3.7 |
| 2007/0017666 | A1 * | 1/2007 | Goenka | B60H 1/004 165/202 |
| 2007/0074717 | A1 * | 4/2007 | Law | C09K 5/063 126/618 |
| 2012/0111386 | A1 * | 5/2012 | Bell | H01L 35/30 136/205 |
| 2012/0152511 | A1 * | 6/2012 | Chang | B60H 1/00428 165/202 |
| 2012/0227926 | A1 | 9/2012 | Field et al. | |
| 2013/0192271 | A1 * | 8/2013 | Barnhart | F25B 21/04 62/3.3 |
| 2013/0192272 | A1 * | 8/2013 | Ranalli | F25B 21/04 62/3.3 |
| 2014/0060086 | A1 * | 3/2014 | Ranalli | B60H 1/00478 62/3.3 |
| 2014/0097261 | A1 * | 4/2014 | Blumenstock | B60H 1/00492 237/5 |
| 2014/0182319 | A1 * | 7/2014 | Hunt | B60H 1/00257 62/238.1 |
| 2014/0208789 | A1 | 7/2014 | Lombardo et al. | |
| 2014/0209278 | A1 * | 7/2014 | Goenka | B60H 1/0005 165/104.13 |
| 2014/0262126 | A1 * | 9/2014 | Ishii | B60H 1/00492 165/10 |
| 2014/0316630 | A1 * | 10/2014 | Kohlberger | B60L 1/003 701/22 |
| 2014/0353392 | A1 * | 12/2014 | Park | B60H 1/00885 237/12.3 B |
| 2014/0374058 | A1 * | 12/2014 | Greiner | B60H 1/00492 165/52 |

* cited by examiner

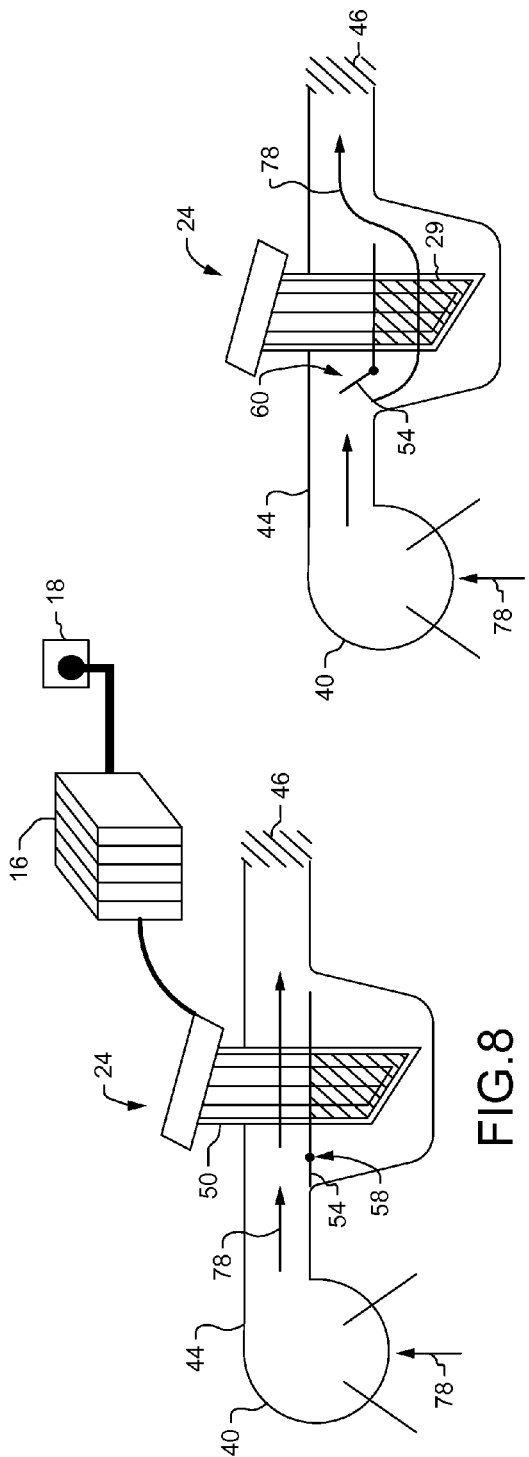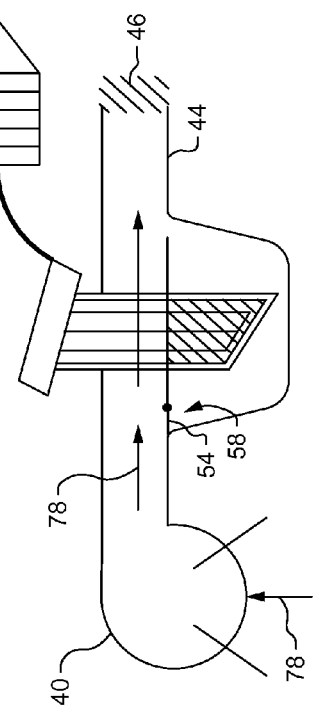

HVAC SYSTEMS FOR ELECTRICALLY-POWERED VEHICLES

FIELD OF DISCLOSURE

The present disclosure generally relates to heating, ventilation, and air-conditioning (HVAC) systems for electrically-powered vehicles (EVs) such as battery electric vehicles (BEVs), hybrid electric vehicles (HEVs), and plug-in hybrid electric vehicles (PHEVs), and more specifically, relates to HVAC systems for EVs that assist in reducing battery power losses associated with vehicle heating.

BACKGROUND

Electrically-powered vehicles (EVs), such as hybrid electric vehicles (HEVs), plug-in hybrid vehicles (PHEVs), and battery electric vehicles (BEVs), have many advantages over vehicles powered by internal combustion engines (ICEs). For example, EVs may be more energy efficient and more environmentally friendly as they produce fewer emissions. An EV may include an electric motor for driving the gearbox and wheels, and the electric motor may be powered by batteries that may be recharged by plugging the vehicle into an electrical power source external to the vehicle, such as an electric outlet. EVs are associated with a driving range which is the distance that the EV may travel before the batteries are depleted and recharging is required. For example, driving ranges for current EVs may be on the order of about 80-300 miles. A plug-in hybrid electric vehicle (PHEV) is a type of EV that includes a small ICE and a fuel tank in addition to the electric motor and batteries. For example, the internal combustion engine may combust fuel to drive the vehicle at high speeds, such as on freeways or open roads, while the electric motor may drive the vehicle on city streets.

However, unlike ICE-powered vehicles in which heat from the ICE may be tapped to heat the passenger cabin, EVs may not have an ICE to use as a heat source and so require auxiliary heating sources. For example, some heating, ventilation, and air-conditioning (HVAC) systems in EVs use electrically-powered heaters that rely on battery power. The power load on the batteries to support the energy needs of the HVAC system may significantly reduce the driving range of the EV. In particular, substantially more battery power is needed to heat the passenger cabin up from a cold temperature to a warm temperature than is needed to maintain the passenger cabin at the warm temperature. To reduce battery power losses associated with initial heating, many EVs allow the driver to program the vehicle to pre-condition the passenger cabin to a comfortable temperature while the vehicle is parked and recharging at the electrical outlet. As a result, the energy requirement to heat the passenger cabin up from a cold temperature is supplied by the electric outlet, thereby reducing the power load on the batteries.

In another effort to reduce the power load on EV batteries for cabin heating, U.S. Patent Application Publication Number 2014/0208789 discloses the use of a phase change material (PCM) positioned about the vehicle battery to store heat from the battery during charging. In addition, a coolant circuit takes heat from PCM to heat the passenger cabin while driving. While effective, further heating system improvements for EVs are still wanting.

Clearly, there is a need for improved HVAC designs for EVs that reduce power loads on the batteries.

SUMMARY

In accordance with one aspect of the present disclosure, a heating, ventilation, and air-conditioning (HVAC) system for an electrically-powered vehicle (EV) having an electric motor powered by at least one battery is disclosed. The HVAC system may comprise a blower, a conduit configured to carry air from the blower to vents leading to a passenger cabin of the EV, and an electric heater positioned in the conduit and configured to heat the air. The HVAC system may further comprise a thermal reservoir heater positioned in the conduit and including a thermal storage component configured to heat the air without using power from the battery.

In another refinement, the EV may be configured to operate in charging mode during which the electric motor is off and the battery is charging at an electric outlet, and in driving mode during which the electric motor is operational and is not connected to the electrical outlet. The thermal storage component may be configured to store heat while the EV is in charging mode.

In another refinement, the thermal storage component may be further configured to release the stored heat while the EV is in driving mode.

In another refinement, the thermal storage component may be a phase change material (PCM) configured to undergo a heat-absorbing phase change while the EV is in charging mode, and a heat-releasing phase change while the EV is in driving mode.

In another refinement, the thermal reservoir heater may further include a second electric heater configured to transfer heat to the PCM while the EV is in charging mode, and the transfer of the heat from the second electric heater to the PCM may cause the PCM to undergo the heat-absorbing phase change.

In another refinement, the electric heater and the second electric heater may be separate zones of a single heater.

In another refinement, the electric heater may be configured to heat the air while the EV is in charging mode in order to pre-condition the passenger cabin to a desired temperature.

In another refinement, the thermal reservoir heater may be configured to heat the air while the EV is in driving mode.

In another refinement, the electric heater may be further configured to heat the air while the EV is in driving mode after the PCM has completed the heat-releasing phase change.

In another refinement, the electric heater and the second electric heater may be positive temperature coefficient (PTC) heaters.

In another refinement, the second electric heater may include at least one PTC heating element, and the PCM of the thermal reservoir heater may be contained in a vessel that is in contact with the PTC heating element.

In accordance with another aspect of the present disclosure, an electrically-powered vehicle (EV) is disclosed. The EV may include a passenger cabin, wheels, an electric motor configured to drive the wheels, and at least one battery configured to power the electric motor. The battery may be charged by plugging the EV into an electric outlet. The EV may be configured to operate in charging mode during which the electric motor is off and the battery is charging at the electric outlet, and in driving mode during which the EV is operational and is not connected to the electric outlet. The EV may further comprise a heating, ventilation, and air-conditioning (HVAC) system that may include a blower, a conduit configured to carry air from the blower to vents leading to the passenger cabin of the EV, and an electric heater positioned in the conduit and configured to heat the air. The HVAC system may further include a thermal reservoir heater positioned in the conduit and having a thermal storage component configured to heat the air without using power from the battery.

In another refinement, the thermal storage component may be a phase change material (PCM) configured to undergo a heat-absorbing phase change while the EV is in charging mode, and to undergo a heat-releasing phase change while the EV is in driving mode.

In another refinement, the thermal reservoir heater may include a second electric heater configured to transfer heat to the PCM while the EV is in charging mode. The transfer of heat from the second electric heater to the PCM may cause the PCM to undergo the heat-absorbing phase change.

In another refinement, the electric heater and the second electric heater may be separate zones of a single heater.

In another refinement, the electric heater may be configured to heat the air while the EV is in charging mode to pre-condition the passenger cabin to a desired temperature.

In another refinement, the thermal reservoir heater may be configured to heat the air while the EV is in driving mode.

In another refinement, the second electric heater may include at least one positive temperature coefficient (PTC) heating element, and the PCM may be contained in a vessel that is in contact with the PTC heating element.

In another refinement, the EV may be a plug-in hybrid electric vehicle (PHEV).

In accordance with another aspect of the present disclosure, a method for heating a passenger cabin of an electrically-powered vehicle (EV) with a heating, ventilation, and air-conditioning (HVAC) system is disclosed. The HVAC system may include an electric heater and a thermal reservoir heater having a thermal storage component. The method may comprise storing heat to the thermal reservoir heater while a battery of the EV is charging at an electric outlet by causing the thermal storage component to undergo a heat-absorbing phase change. The method may further comprise heating the passenger cabin using the thermal reservoir heater while the EV is operational by causing the thermal storage component to undergo a heat-releasing phase change.

These and other aspects and features of the present disclosure will be more readily understood when read in conjunction with the accompanying drawings.

BRIEF DESCRIPTION OF THE DRAWINGS

FIG. 8 is a schematic representation of the HVAC system of FIG. 3 while pre-conditioning a passenger cabin of the EV with an electric heater, constructed in accordance with the present disclosure.

FIG. 9 is a schematic representation of the HVAC system of FIG. 3 while heating the passenger cabin with the thermal reservoir heater, constructed in accordance with the present disclosure.

FIG. 10 is a schematic representation of the HVAC system of FIG. 3 while heating the passenger cabin with the electric heater, constructed in accordance with the present disclosure.

It should be understood that the drawings are not necessarily drawn to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments disclosed herein.

DETAILED DESCRIPTION

Figure 1:
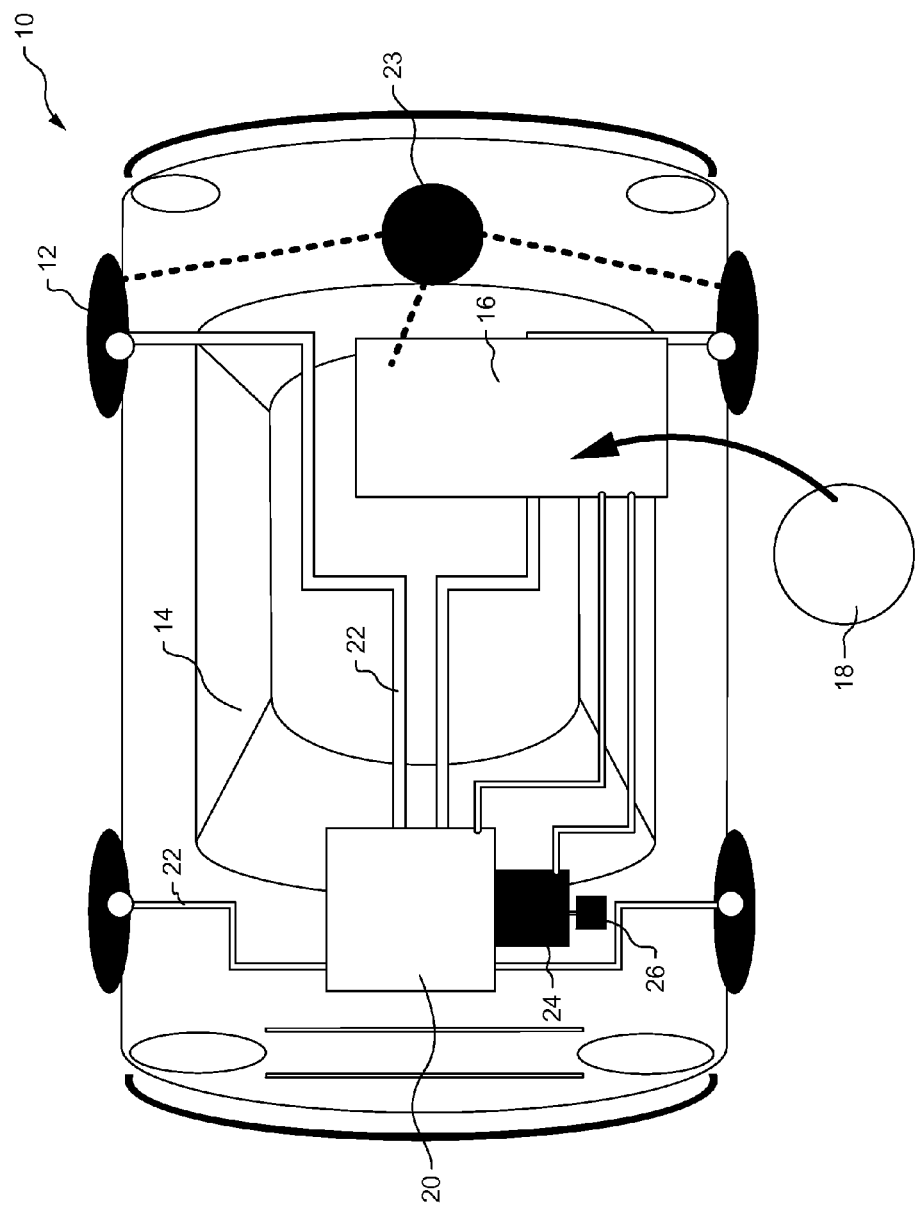
FIG. 1 is a schematic representation of an electrically-powered vehicle (EV) having a heating, ventilation, and air-conditioning (HVAC) system, in accordance with the present disclosure.

Referring now to the drawings, and with specific reference to FIG. 1, an electrically-powered vehicle (EV) 10 constructed in accordance with the present disclosure is shown. The EV 10 may be various types of electrically-powered vehicles such as battery electric vehicles (BEVs), plug-in hybrid electric vehicles (PHEVs), and hybrid electrical vehicles (HEVs) that are not plugged in. For example, if the EV is a BEV, it may include wheels 12, a passenger cabin 14, one or more batteries 16 that may be charged and at an external electrical power source such as an electric outlet 18, and an electric motor 20 that may be electrically connected to and powered by the battery 16. The electric motor 20 may be configured to drive a gearbox and the wheels 12 via various drivetrains 22. Furthermore, the EV 10 may include a regenerative braking system 23 that may return wasted energy from the wheels 12 to regenerate the battery 16, such as when the EV 10 is freewheeling downhill or braking. The EV 10 may operate in charging mode during which the electric motor 20 is off and the battery 16 is charging at the outlet 18, and in driving mode during which the vehicle is operational and is not connected to the outlet 18. The EV 10 may further include a heating, ventilation, and air-conditioning (HVAC) system 24 and an electronic control unit (ECU) 26 that may control the HVAC system 24 as well as various additional functions of the EV 10. The HVAC system 24 may be powered by the battery 16 and may be configured to control the temperature of the passenger cabin 14. As discussed in further detail below, the HVAC system 24 may include a thermal reservoir heater 29 (see FIG. 3) that may store heat energy while the battery 16 of the EV 10 is charging at the electrical outlet 18, and may provide a heat source that does not place a power drain on the battery 16 while the EV 10 is in driving mode.

Figure 11:
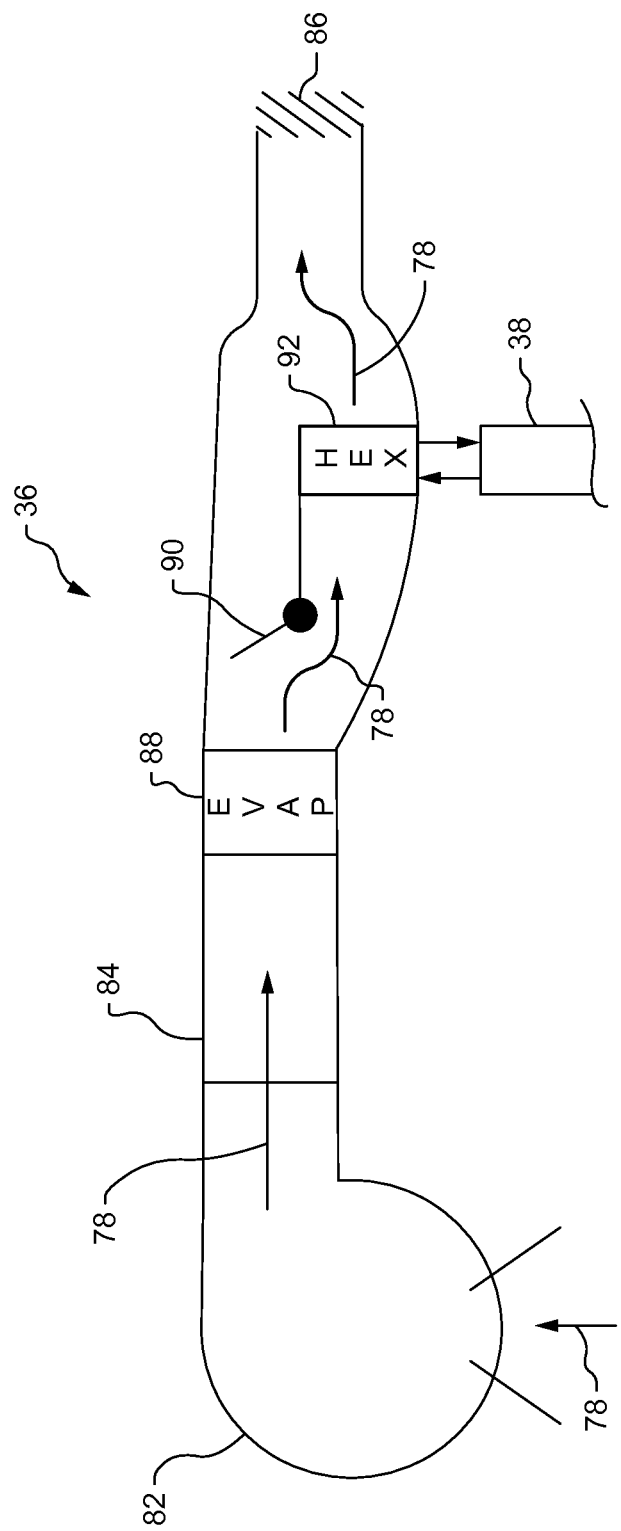
FIG. 11 is a schematic representation of a coolant-based heating system of the PHEV of FIG. 2, constructed in accordance with the present disclosure.

If the EV 10 is a PHEV 30 it may include many of the above features and may further include an internal combustion engine (ICE) 32 and a fuel tank 34. The ICE 32 may combust fuel from the fuel tank 34 to drive the gearbox and the wheels 12 via various drivetrains 22. For example, the ICE 32 may drive the PHEV 30 while operating at high speeds, such as on freeways or open roads, and the electric motor 20 may drive the PHEV 30 on city streets. As is well-understood by those skilled in the art, a regenerative braking system 35 may return otherwise wasted energy from the wheels 12 to regenerate the battery 16, such as when PHEV 30 is freewheeling downhill or braking. In addition, the HVAC system 24 of the PHEV 30 may further include a coolant-based heating system 36 that may draw heat from the ICE 32 via one or more coolant lines 38 (see FIG. 11 and further details below).

Figure 3:
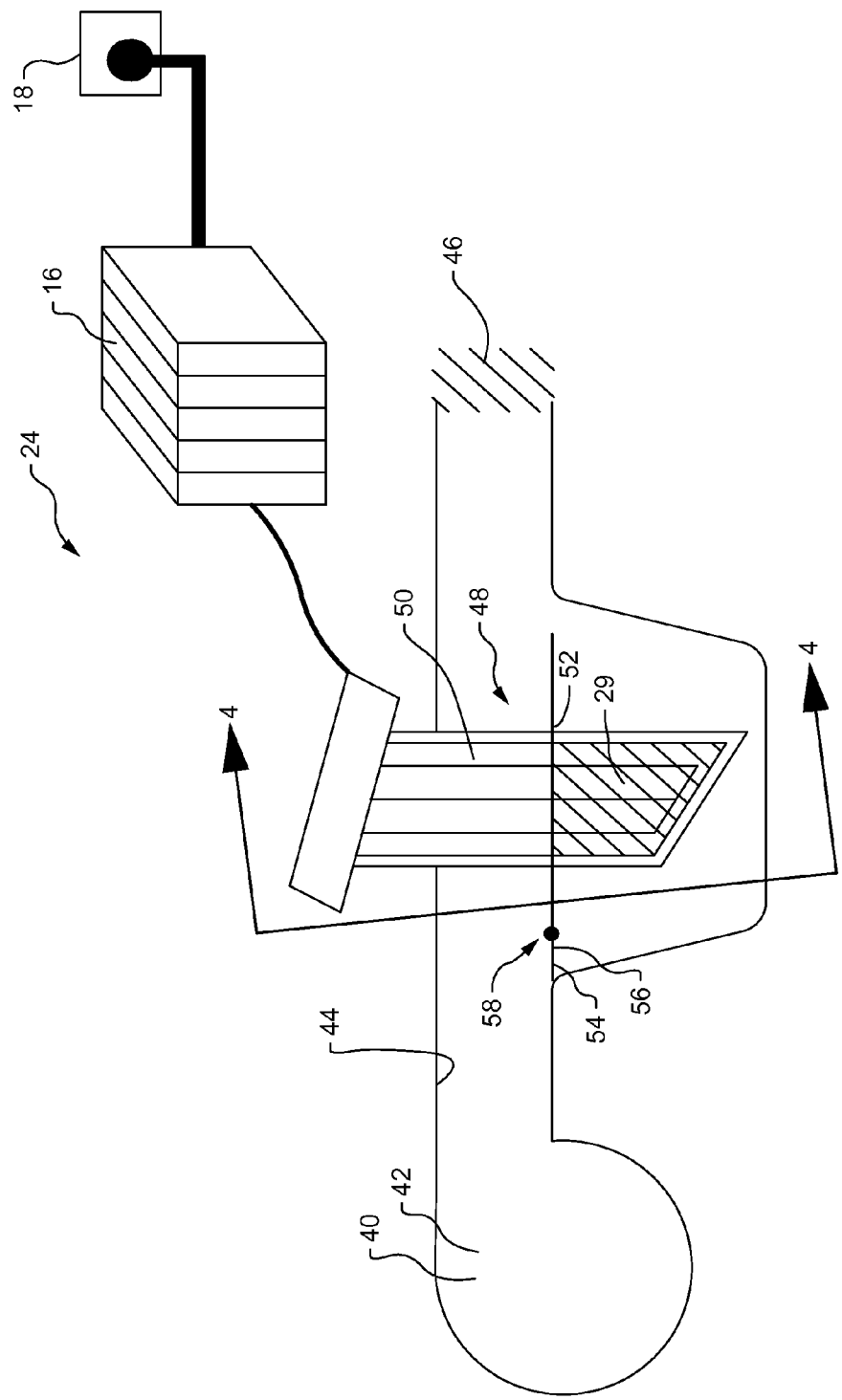
FIG. 3 is a schematic representation of the HVAC system of FIG. 1 while the EV is charging at an electric outlet, constructed in accordance with the present disclosure.
Figure 4:
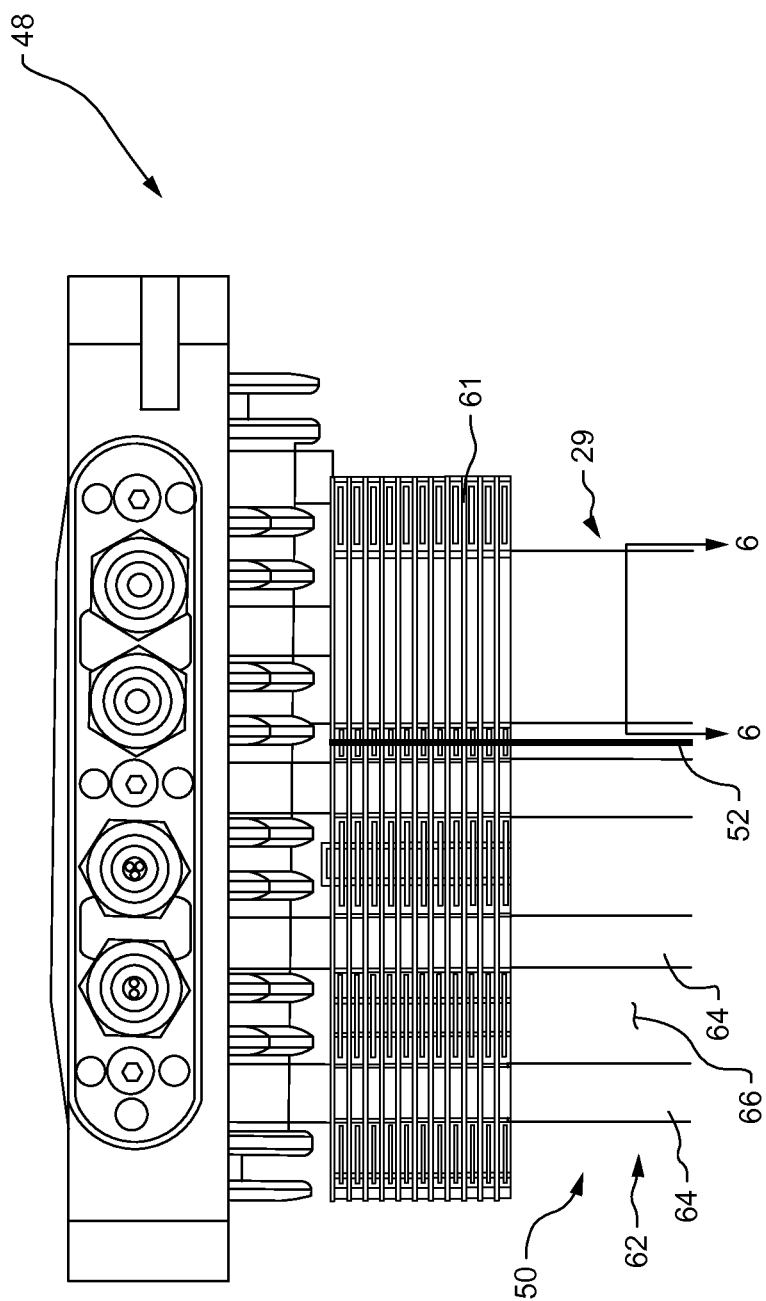
FIG. 4 is a cross-sectional view through the section 4-4 of FIG. 3, depicting a heating system of the HVAC system, constructed in accordance with the present disclosure.

Turning now to FIG. 3, the HVAC system 24 of the EV 10 is shown in isolation. Except where indicated otherwise, the features of the HVAC system 24 as described below may be implemented in many types of EVs, including BEVs, HEVs, and PHEVs. FIG. 3 depicts the HVAC system 24 while the EV 10 is in charging mode. The HVAC system 24 may include a blower 40, such as a fan 42, that may be configured to blow air from the passenger cabin 14 or outside of the vehicle into a conduit 44 that may carry the air to vents 46 leading to the passenger cabin 14 (at feet level, face level, windshield level, waist level, body level, etc.). Positioned in the conduit 44 downstream of the blower 40 may be a heating system 48 that may include an electric heater or heating zone 50 as well as the thermal reservoir heater or zone 29. In one implementation, the electric heater 50 and the thermal reservoir heater 29 may be separate heaters that are independently operated. In an alternative arrangement, the electric heater 50 and the thermal reservoir heater 29 may be separate zones 50 and 29 of a single heater that are independently operated of each other. Thus, although referred to as heaters 50 and 29 in the following paragraphs, it will be understood that the heaters 50 and 29 may be separate zones of a single heater as well.

The electric heater 50 and the thermal reservoir heater 29 may each be configured to heat the air in the conduit 44 prior to delivery to the passenger cabin 14, and may be regulated independently of each other. The electric heater 50 may be powered by the battery 16 and may thus drain power from the battery 16 while the EV is in driving mode. In contrast, the thermal reservoir heater 29 may store heat while the battery 16 is charging at the outlet 18, and may use the stored heat to heat the passenger cabin 14 without draining the battery 16 while the EV is in driving mode.

The electric heater 50 and the thermal reservoir heater 29 may be separated by a barrier 52, and an airflow regulating device 54, such as a blend door 56, that may be upstream or downstream of the electric heater 50 and the thermal reservoir heater 29 to regulate the flow of the air to or from the electric heater 50 and/or the thermal reservoir heater 29. For example, the airflow regulating device 54 may adopt a first position 58 in which all or some of the air from the blower 40 is sent to the electric heater 50, a second position 60 in which all or some of the air from the blower 40 is sent to the thermal reservoir heater 29 (see FIG. 9), as well as various intermediate positions therebetween in which different fractions of the air are passed to the electric heater 50 and the thermal reservoir heater 29. As explained in further detail below, the airflow regulating device 54 may be controlled by the ECU 26 (see FIG. 12).

FIGS. 4-7 depict an exemplary construction of the heating system 48 of the HVAC system 24. The air to be heated by the heating system 48 may be passed through fins 61, and the electric heater 50 may be disposed on one side of the thermal reservoir heater 29 and separated therefrom by the barrier 52, such as in the arrangements shown in FIGS. 4-5. If the heating system 48 is arranged as in FIG. 5, it will be understood that it may also include the details shown in FIG. 4 as well. In one aspect of the present disclosure, the electric heater 50 may be a positive temperature coefficient (PTC) heater 62 which may include a number of PTC units 64 or stones that include barium titanate or another suitable material. The PTC heating units 64 may be oriented parallel to one another with gaps 66 therebetween to permit the passage of air between the PTC heating units, although many alternate configurations of the PTC heating units 64 are possible. The use of the PTC heater 62 as the electric heater 50 may be advantageous over other types of electric heaters, such as resistive heaters, as the PTC heater 62 may be incapable of overheating. However, the electric heater 50 may be another type of electric heater as well, such as a resistive heater, a thin film heater, among other types of heaters.

Referring still to FIGS. 4-7, the thermal reservoir heater 29 may include a second heater 68, such as an electric heater, as well as a thermal storage component 70 in heat-exchange relation with the second heater 68 such that the thermal storage component 70 may collect heat from the second heater 68 while the EV 10 is in charging mode. The second heater 68 may be powered/heated by the battery 16 while the EV 10 is in charging mode, and the heat from the second heater 68 may be transferred to the thermal storage component 70 to store heat in the thermal storage component 70. As one possibility, the second heater 68 may be a PTC heater 72 that includes one or more PTC units 73 or stones, such as barium titanate stones, that heat up while the battery 16 is charging at the outlet 18. Alternatively, the second heater 68 may be another type of electrically-powered heater, such as a resistive heater, a thin-film heater, among other types of heaters. In addition, in other alternative arrangements, the electric heater 50 and the second heater 68 may be separate units (50 and 68) integrated into a single heater that performs the functions of both of heaters. For example, a single heater may contain multiple zones or legs (such as PTC units 64 and 73) that are operated independently or in sets. In such an arrangement, the single heater may supply heat to the thermal storage component 70 during charging. As yet another possibility, several heaters may perform the functions of the heaters 50 and 68.

Figure 6:
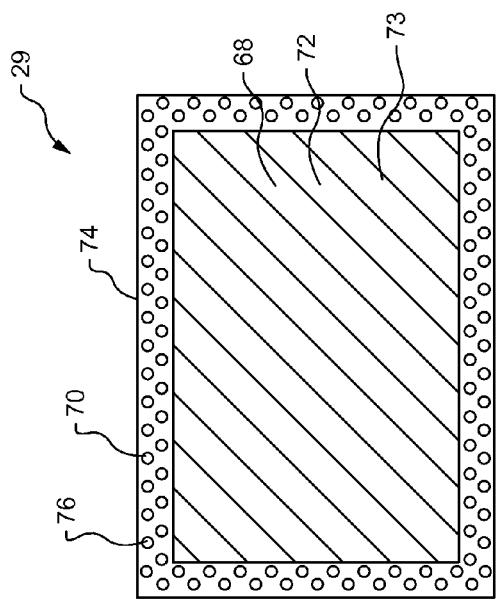
FIG. 6 is a cross-sectional view through the section 6-6 of FIG. 4, depicting a construction of a thermal reservoir heater of the heating system, constructed in accordance with the present disclosure.
Figure 7:
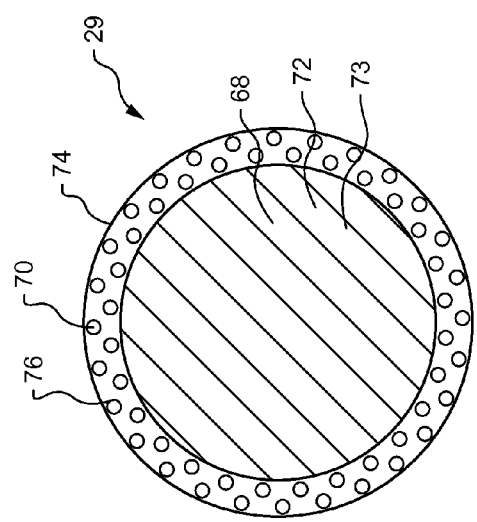
FIG. 7 is a cross-sectional view similar to FIG. 6, but with the thermal reservoir heater having a round shape, constructed in accordance with the present disclosure.
Figure 5:
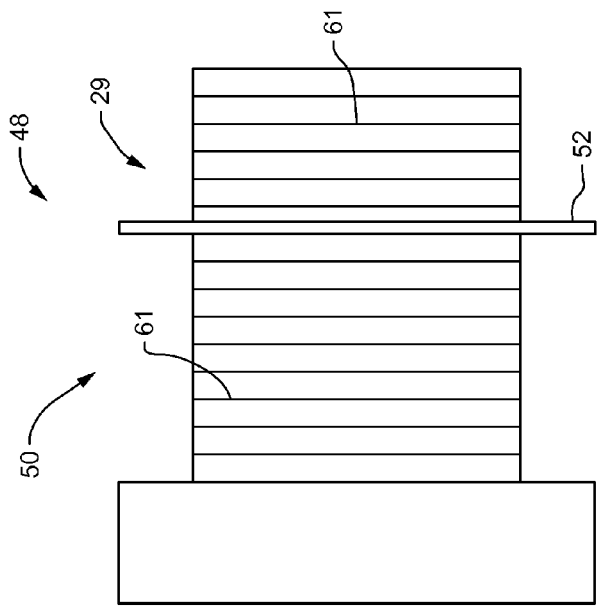
FIG. 5 is a cross-sectional view similar to FIG. 4 but showing an alternative arrangement of the heating system of the HVAC system, constructed in accordance with the present disclosure.

As best shown in FIGS. 6-7, the thermal storage component 70 may be in contact with each of the PTC units 73 to permit heat transfer from the PTC unit 73 to the thermal storage component 70 during charging of the EV 10. For example, the thermal storage component 70 may be contained in a vessel 74, such as a rectangular (FIG. 6), round (FIG. 7) or other shaped tube, that surrounds or is otherwise in thermal contact with the PTC unit 73 of the second heater 68. Alternatively, the thermal storage component 70 may be contained in a vessel or other structure inside of the PTC unit 73, or it may be arranged in a vessel alongside of the PTC unit 73. In one aspect of the present disclosure, the thermal storage component 70 may be a phase change material (PCM) 76 that may undergo a phase change at a characteristic phase change temperature with a concomitant absorbance or release of heat. As used herein, a PCM is a material that uses the latent heat of fusion to store or release energy when undergoing a change of phase. As one possibility, the PCM 76 may melt to a liquid (and absorb heat) and solidify to a solid (and release heat) at the phase change temperature, although other types of phase changes (e.g., solid-solid, gas-liquid, etc.) may also apply. For example, the second heater 68 may heat the PCM 76 while the EV 10 is in charging mode, causing the PCM 76 to melt to a liquid and absorb/store heat. When exposed to cold air flowing through the conduit 44, the PCM 76 of the thermal reservoir heater 29 may solidify with a concomitant release of heat that warms the air in the conduit 44.

The PCM 76 may be any suitable type of PCM such as, but not limited to, a eutectic mixture, a salt hydrate, or organic material such as waxes, oils, fatty acids, and polyglycols. Non-limiting examples of PCMs that may be used as the thermal storage component 70 include pure salts (ionic compounds comprising, at least in part, a metal cation or other cation), and metals such as relatively low temperature metals that transition between solidus and liquidus in a lower temperature regime (<1000° C.) such as lead, lithium, silver, zinc, and aluminum. Other non-limiting examples of PCMs include hydrated salts, hydrated salts in solution, hydrated salts chemically modified to hinder segregation or other undesirable traits during operation, and organic PCMs such as polymers which may be compounds derived from plant or animal fats, such as paraffin, fatty acids, waxes, hydrogenated oils, and polyglycols, among others.

In addition, the PCM 76 may have a phase change temperature compatible with the heating range of the second heater 68. For example, if the second heater 68 operates at temperatures of about 200° C. or below, the PCM 76 may have a phase change temperature of between about 50° C. to about 150° C. However, it will be understood that the thermal storage component 70 may be any other type of component capable of storing heat during battery charging for later release.

Referring again to FIG. 3, a process for storing heat to the thermal storage component 70/PCM 76 while the EV 10 is in charging mode will now be described. When the EV 10 is in charging mode, the second heater 68 may be powered by the battery 16 to provide heat to the thermal storage component 70/PCM 76. The second heater 68 may be heated to a temperature above the PCM 76 melting temperature, causing the PCM 76 to melt and absorb heat, or undergo another type of heat-absorbing phase change. Once the PCM 76 has fully or at least partially melted, the second heater 68 may be switched off to allow power from the electrical outlet 18 to be used for other purposes. In this arrangement, the energy flow may be from the electrical outlet 18 to the battery 16 (electrical energy) to the second heater 68 (electrical energy) to the thermal storage component 70/PCM 76 (heat energy), although there may be other energy flows used to transfer the energy to the second heater 68. The storage of heat to the thermal storage component 70/PCM 76 may occur automatically, or may be set manually.

Turning to FIG. 8, the electric heater 50 may pre-condition or pre-heat the passenger cabin 14 to a desired temperature (or temperature range) while the EV 10 is in charging mode. Specifically, the blower 40 may draw in air 78 to be heated from the passenger cabin 14 and/or from the outside environment. The airflow regulating device 54 may be in the first position 58 or another intermediate position to ensure that at least some of the air 78 is passed to the electric heater 50 and to prevent heat loss from the thermal storage component 70/PCM 76. Using power from the battery 16 while the EV 10 is in charging mode, the electric heater 50 may heat the air 78 to the desired temperature and the heated air 78 may then pass to the vents 46 for delivery into the passenger cabin 14. Pre-conditioning of the passenger cabin 14 in this way may reduce the power burden on the battery 16 caused by the electric heater 50 while the EV 10 is in driving mode, as significantly more energy may be required to heat up the passenger cabin 14 to a warm temperature from a cold temperature than is required to maintain the cabin 14 at the warm temperature. Pre-conditioning of the cabin 14 may occur automatically or may be requested by a user/driver at a user input control 80 (see FIG. 12 and further details below), such as a control button in the passenger cabin 14, a computerized interface in the passenger cabin, or an internet enabled device such as a personal computer or mobile device.

FIG. 9 shows the HVAC system 24 while heating the passenger cabin 14 with the thermal reservoir heater 29. In the depicted arrangement, the thermal reservoir heater 29 is heating the air 78 while the EV 10 is in driving mode. The airflow regulating device 54 may be in the second position 60 or another intermediate position such that at least some of the air 78 drawn into the conduit 44 by the blower 40 is directed to the thermal reservoir heater 29. For example, the device 54 may be partially or fully open to direct at least some of the air 78 to the thermal reservoir heater 29. The passage of the air 78 by or through the thermal reservoir heater 29 may cause the thermal storage component/PCM 76 to undergo a phase change during which heat is released into the air 78 to heat up the air 78. Since the heat energy was stored in the thermal reservoir heater 29 during charging of the battery 16 as described above, the thermal reservoir heater 29 may heat the air 78 without imposing a power drain on the battery 16. This heating arrangement may be used, for example, to maintain the desired temperature in the passenger cabin 14 after the passenger cabin 14 has been pre-conditioned by the electric heater 50 as shown in FIG. 8. As less energy is required to maintain the desired temperature than is required to heat up the passenger cabin 14 from an initial cold temperature, the thermal reservoir heater 29 may heat the air 78 for a relatively long period of time without draining power from the battery 16 and henceforth reducing the driving range of the EV 10. In addition, the electric heater 50 may be off at this stage so that it is not drawing power from the battery 16. It is noted that heating of the cabin 14 as described above may occur automatically or may be manually requested by the user using controls in the cabin 14.

The thermal energy stored in the thermal reservoir heater 29 may be depleted when the PCM 76 has completed the heat-releasing phase change. At this point, and if passenger cabin heating is still needed while the EV 10 is in driving mode, the electric heater 50 may heat the air 78 as shown in FIG. 10. Specifically, the airflow regulating device 54 may revert to the first position 58 or another intermediate position such that at least some of the air 78 drawn into the conduit 44 is directed to the electric heater 50. For example, the device 54 may be fully or partially closed to direct at least some of the air 78 to the electric heater 50. As the electric heater 50 may be powered by the battery 16, heating of the air 78 as shown in FIG. 9 may drain power from the battery 16, possibly reducing the driving range of the EV 10.

Figure 2:
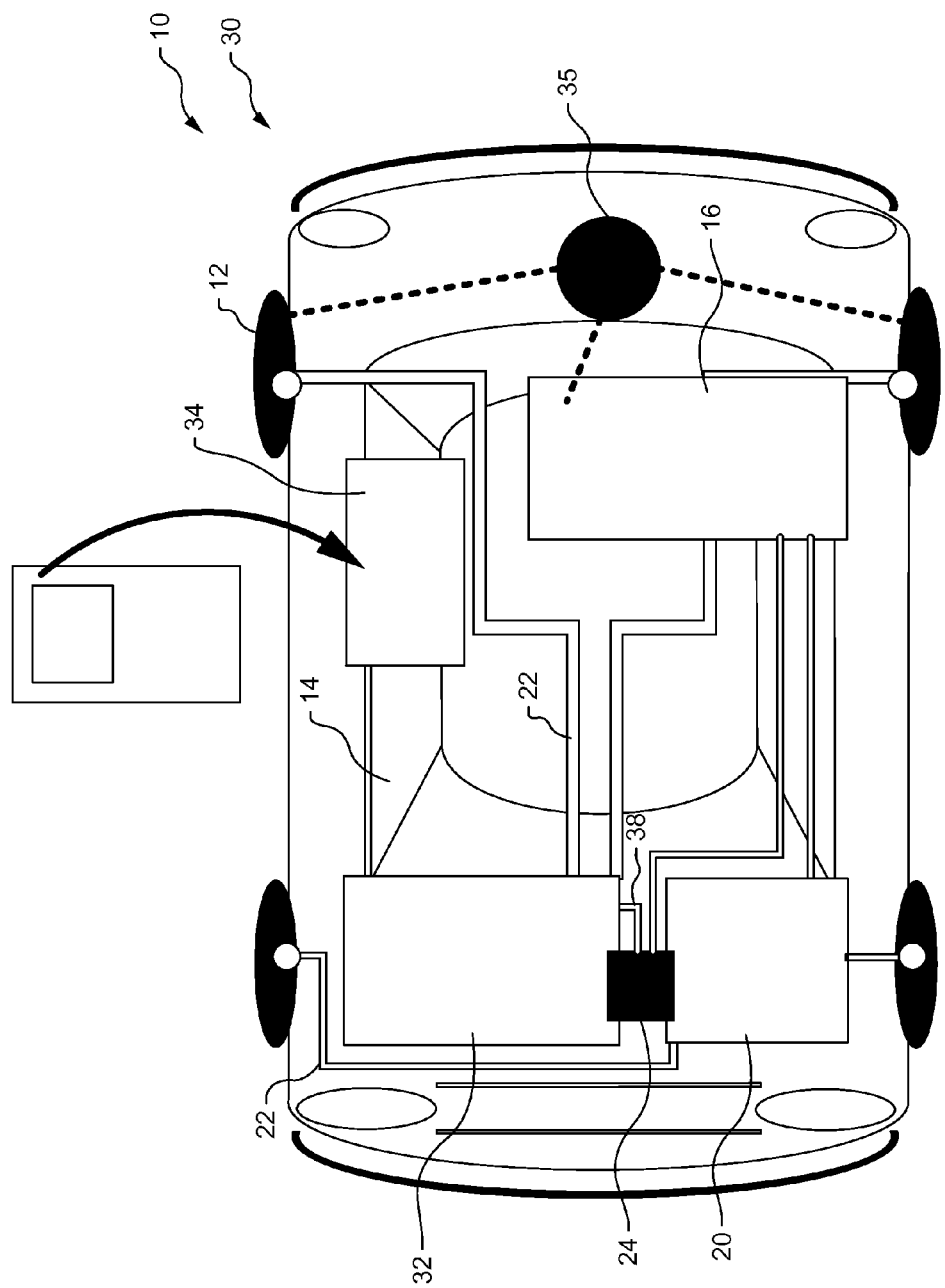
FIG. 2 is a schematic representation similar to FIG. 1, but with the EV being a plug-in hybrid electric vehicle (PHEV), in accordance with the present disclosure.

If the EV 10 is the PHEV 30, then heating of the passenger cabin 14 may be alternatively provided by the coolant-based heating system 36 after the thermal storage component 70 is depleted (see FIG. 10). Although well understood by those with ordinary skill in the art, the general operation of the coolant-based heating system 36 will now be described. Specifically, a blower 82 of the coolant-based heating system 36 may draw air 78 to be heated into a conduit 84 configured to carry the air 78 from the blower 82 to vents 86 leading to the passenger cabin 14. The air 78 from the blower 82 may first be passed through an evaporator 88 in the conduit 84 which may at least partially dehumidify the air 78. An airflow regulating device 90, such as a blend door, may be downstream of the evaporator 88 in the conduit 84 and may direct the air 78 to a heat exchanger (HEX) 92 for heating. The HEX 92 may be in heat exchange relation with one or more coolant lines 38 which may carry heat from the ICE 32 (also see FIG. 2). The HEX 92 may collect heat from the coolant line(s) 38 and may use the heat to heat the air 78 prior to entry into the passenger cabin 14. In some arrangements, the heating system 36 may also include an electric heater, such as a PTC heater, downstream or upstream of the HEX 92 to provide additional heat, such as when the ICE 32 is cold at initial engine start-up. Heating with the coolant-based heating system 36 rather than the electric heater 50 may be used, for example, when the ICE 32 is driving the PHEV 30, when the battery 16 is depleted, and/or when it is desirable to reduce power loads on the battery 16. It will be understood that, in alternative arrangements, the coolant-based heating system 36 may share a blower, a conduit, and/or an airflow-regulating device with the electric heater 50 and the thermal reservoir heater 29.

Figure 12:
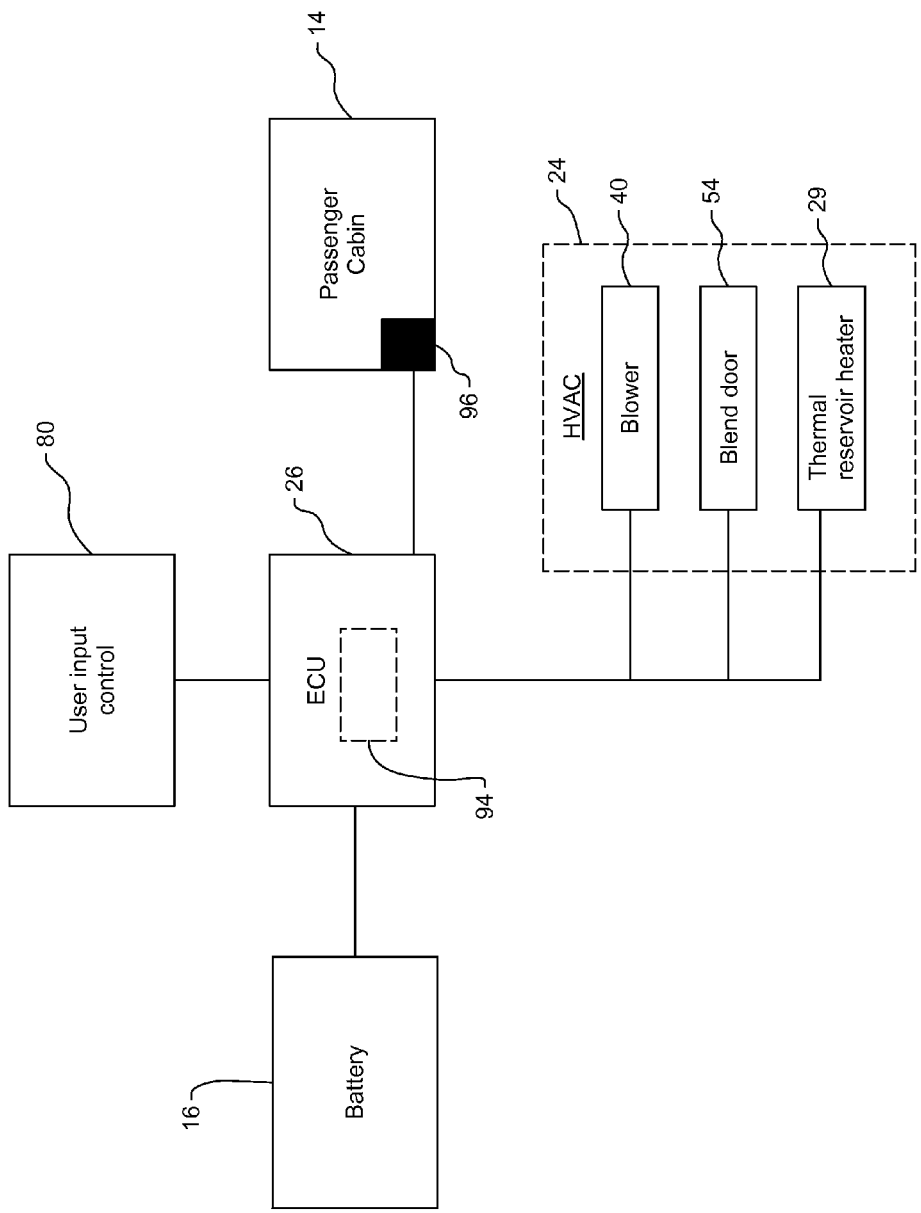
FIG. 12 is schematic block diagram of a control strategy for the HVAC system, system constructed in accordance with the present disclosure.

FIG. 12 shows an exemplary control strategy for the HVAC system 24 of the EV 10 as implemented by the ECU 26. The ECU 26 may include a processor 94 capable of executing specified programs involved in controlling the HVAC system 24. The ECU 26 may be in electrical or wireless communication with the user input control 80, as well as one or more temperature sensors 96 capable of detecting the temperature of the passenger cabin, ducting or other part of the HVAC system 14, and/or the outside environment. In addition, the ECU 26 may be in electrical communication with the battery 16 and may receive signals from the battery 16 indicated the charge level of the battery. Based on input from the user input control 80, the temperature sensor(s) 96, and/or the battery 16, the ECU 26 may regulate activity of the HVAC system 24 accordingly. In particular, the ECU 26 may be in electrical communication with and may control the blower 40 and the airflow regulating device 54. Specifically, the ECU 26 may turn the blower 40 on or off and may regulate the speed of the blower 40 and the resulting flowrate of the air 78 through the conduit 44. In addition, the ECU 26 may also control the position of the airflow regulating device 54 to control whether the air 78 is directed to either or both of the electric heater 50 and the thermal reservoir heater 29.

The ECU 26 may also be in electrical communication with the thermal reservoir heater 29 which may provide signals indicative of the depletion state of the thermal storage component 70. For example, if the thermal storage component 70 is the PCM 76, the thermal reservoir heater 29 may include sensors that detect the phase state of the PCM 76 to determine whether all of the heat stored in the PCM 76 has been dissipated. When the thermal storage component 70 is depleted, the ECU 26 may adjust the airflow regulating device 54 accordingly to direct all or some of the air 78 to the electric heater 50 if heating in the cabin 14 is still needed (see FIG. 10).

Figure 13:
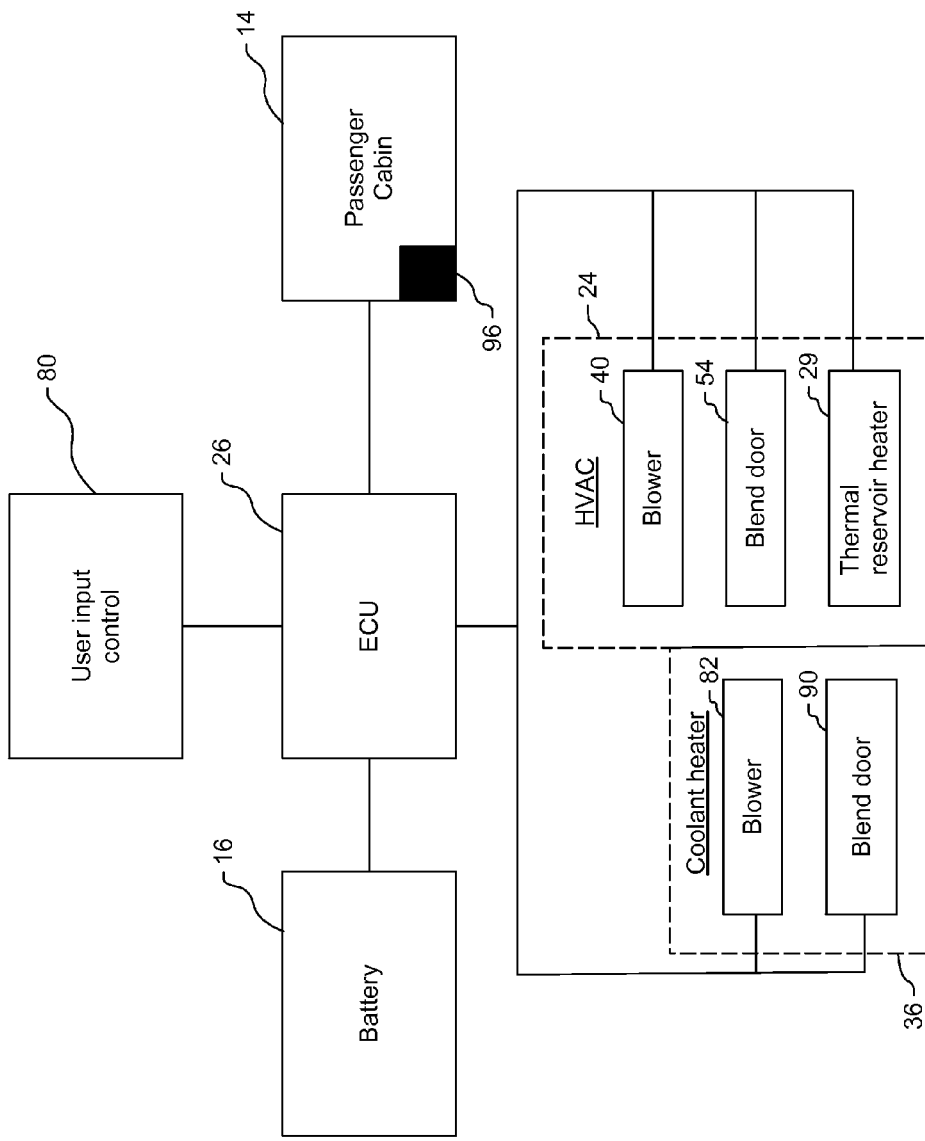
FIG. 13 is a schematic block diagram of a control strategy for the HVAC system when the EV is a PHEV, constructed in accordance with the present disclosure.

FIG. 13 shows an exemplary control strategy, as implemented by the ECU 26, for the HVAC system 24 when the EV 10 is the PHEV 30. The control strategy is the same as that described above and shown in FIG. 12, except that the ECU 26 may further be in electronic communication with and may control components of the coolant-based heating system 36. Specifically, the ECU 26 may be in electronic communication with and may control the blower 82 and the airflow regulating device 90 of the coolant-based heating system 36. In this case, when the thermal storage component 70 is depleted and the thermal reservoir heater 29 is no longer able to heat the air 78, the ECU 26 may determine whether either or both of the electric heater 50 and the coolant-based heating system 36 will provide heat to the cabin 14. The determination as to which of the heaters 50 or 36 supplies heat to the cabin 14 may be based on various factors, such as the operating speed of the PHEV 30, as well as the power level remaining in the battery 16. In this regard, the ECU 26 may also be in electronic communication with the battery 16 and may receive input as to the power level remaining in the battery 16.

Figure 14:
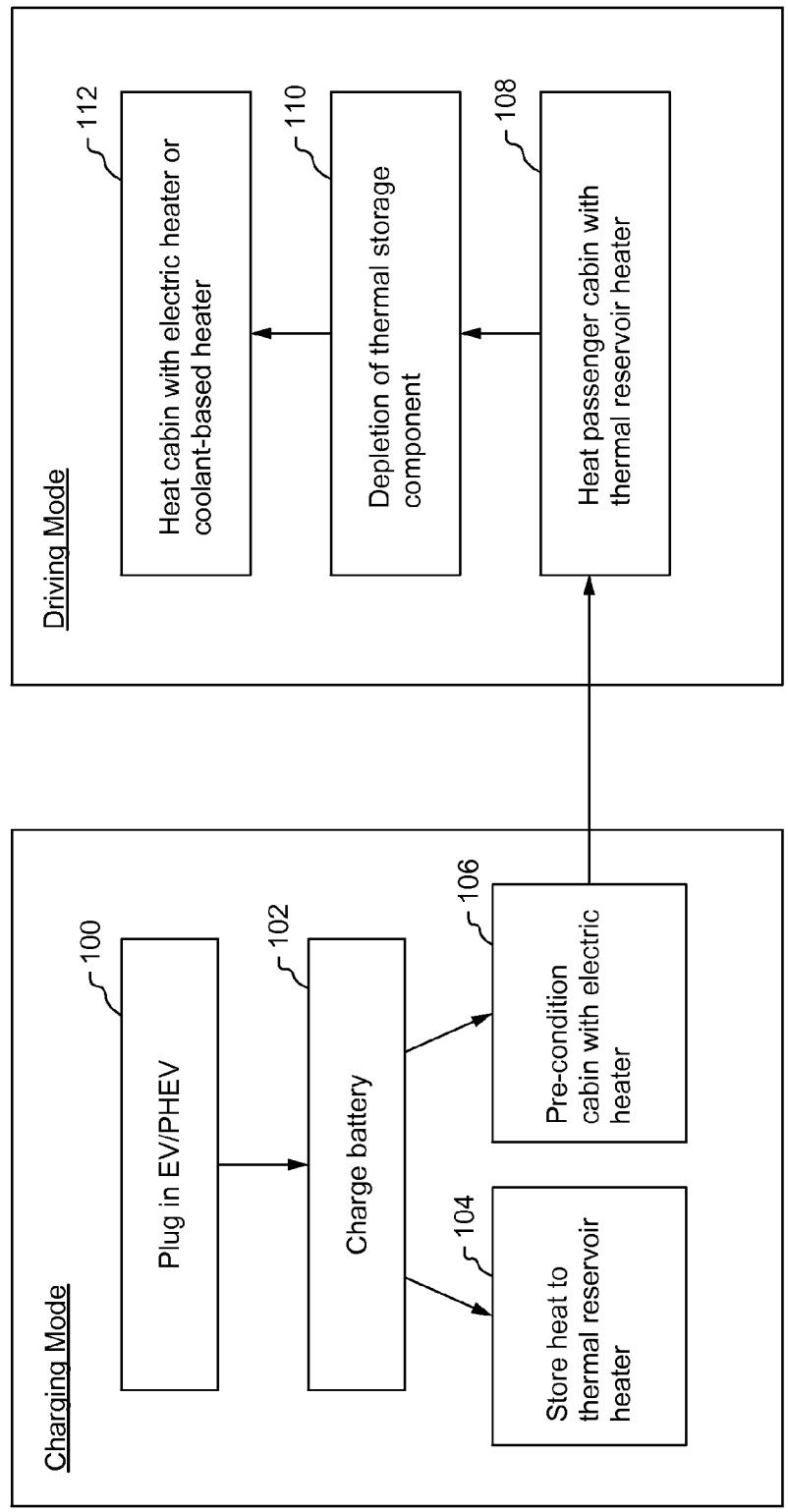
FIG. 14 a flowchart of an exemplary method of using the HVAC system to heat the passenger cabin of the EV, in accordance with a method of the present disclosure.

Referring now to FIG. 14, a method for using the HVAC system 24 to heat the passenger cabin 14 of the EV 10 is shown. Beginning with a first block 100 and a next block 102, the EV 10 may be plugged into the electric outlet 18 to recharge the battery 16. While the battery 16 is charging, heat may be stored to the thermal reservoir heater 29 according to a block 104. For example, the second heater 68 may be heated by the battery 16, and the second heater 68 and may transfer the heat to the thermal storage component/PCM 76 to cause the PCM 76 to undergo a heat-absorbing phase change. In addition, if requested by the user at the user input control 80 or otherwise pre-programmed into the EV, the electric heater 50 may pre-condition/pre-heat the passenger cabin 14 to a desired temperature while the battery is charging (block 106 and FIG. 8) such that the high energy requirement to heat up the passenger cabin 14 to the desired temperature from an initial cold temperature is supplied by the electric outlet 18 rather than the battery 16 when the EV 10 is in driving mode.

When the EV 10 is in driving mode, the thermal reservoir heater 29 may be used to heat the passenger cabin 14 according to a next block 108 (see FIG. 9). For example, the thermal reservoir heater 29 may assist in maintaining the passenger cabin at or near the pre-conditioned temperature, or it may otherwise regulate the temperature in the passenger cabin 14 by heating. Specifically, the thermal storage component 70/PCM 76 of the thermal reservoir heater 29 may undergo a heat-releasing phase change to heat the air 78 prior to delivery into the passenger cabin 14. As the heating activity of the thermal reservoir heater 29 does not require power from the battery 16, heating of the passenger cabin 14 in this way advantageously avoids depletion of the battery 16. When the PCM 76 has completed the phase change and can no longer release heat, the thermal storage component/PCM 76 may be depleted (block 110). At this point, the passenger cabin 14 may be heated by the electric heater 50 according to a next block 112 if cabin heating is still needed (see FIG. 10). Alternatively, if the EV 10 is a PHEV 30, the passenger cabin 14 may be heated by the coolant-based heater 36 (see FIG. 11) in combination with or instead of the electric heater 50.

INDUSTRIAL APPLICABILITY

In general, it can therefore be seen that the technology disclosed herein may have industrial applicability in a variety of settings including, but not limited to, HVAC systems for electrically-powered vehicles such as BEVs, PHEVs, and HEVs. The technology disclosed herein introduces a thermal reservoir heater for an EV HVAC system that includes a thermal storage component capable of storing heat while the EV is charging at an electrical outlet. As disclosed herein, the thermal storage component may be one or more PCMs that undergo a heat-absorbing phase change during battery charging. The absorbed heat can be later released to heat the passenger cabin of the EV as the PCM undergoes a heat-releasing phase change. As the heat-releasing phase change is a passive process, such heating of the passenger cabin may be accomplished without placing any power burden on the battery when the EV is in driving mode. Thus, the thermal reservoir heater as disclosed herein may prevent reduction of EV driving ranges due to the reduced power load on the battery compared with battery-reliant electric heaters of the prior art. In addition, fitment of the thermal reservoir heater into existing EV HVAC ducting space and plumbing technology may be readily accomplished with slight adjustments to add the airflow regulating device/blend door and space for the volume of the thermal storage component/PCM. As another advantage, the heating method disclosed herein uses power provided by the electrical outlet, rather than the battery, to initially heat the passenger cabin up to a desired temperature, thereby further reducing the power load on the battery when the EV is in driving mode. It is expected that technology disclosed herein may find wide industrial applicability in areas such as, but not limited to, HVAC systems or heating systems for EVs such as BEVs, HEVs, and PHEVs, as well as other battery-powered heating systems.

What is claimed:

1. A heating, ventilation, and air-conditioning (HVAC) system for an electrically-powered vehicle (EV), comprising:
a blower;
a conduit configured to carry air from the blower;
a heating system positioned in the conduit and having a first heating zone and a second heating zone separated by a barrier, the first heating zone including an electric heater and the second heating zone including a second electric heater and a phase change material (PCM) at least partially surrounding the second electric heater, the barrier dividing the conduit into a first channel leading to the first heating zone and a second channel leading to the second heating zone; and
a single airflow regulating device upstream of the heating system and the barrier, the airflow regulating device being configured to regulate a flow of the air between the first channel and the second channel.

2. The HVAC system of claim 1, wherein the PCM is contained in a vessel that surrounds the second electric heater.

3. The HVAC system of claim 1, wherein the second electric heater is a positive temperature coefficient (PTC) heater.

4. The HVAC system of claim 1, wherein the second electric heater is a positive temperature coefficient (PTC) heater that includes barium titanate stones.

5. The HVAC system of claim 3, wherein the electric heater is a positive temperature coefficient (PTC) heater.

6. The HVAC system of claim 5, wherein the electric heater and the second electric heater are independently operated of each other.

7. The HVAC system of claim 5, wherein the first heating zone and the second heating zone are independently operated zones of a same heater.

8. The HVAC system of claim 5, wherein the airflow regulating device is a blend door.

9. The HVAC system of claim 8, wherein the blend door is configured to shift between a first position in which more of the air is directed to the first channel than the second channel, and a second position in which more of the air is directed to the second channel than the first channel.

10. The HVAC system of claim 9, wherein the flow of the air to the second heating zone is blocked when the blend door is in the first position, and wherein the flow of the air to the first heating zone is blocked when the blend door is in the second position.

11. An electrically-powered vehicle (EV), comprising:
a passenger cabin;
wheels;
an electric motor configured to drive the wheels;
at least one battery configured to power the electric motor; and
a heating, ventilation, and air-conditioning (HVAC) system including
a blower,
a conduit configured to carry air from the blower to vents leading to the passenger cabin of the EV,
a heating system positioned in the conduit and having a first heating zone and a second heating zone separated by a barrier, the first heating zone including an electric heater and the second heating zone including a second electric heater and a phase change material (PCM) at least partially surrounding the second electric heater, the barrier dividing the conduit into a first channel leading to the first heating zone and a second channel leading to the second heating zone; and
a single airflow regulating device upstream of the heating system and the barrier, the airflow regulating device being configured to regulate a flow of the air between the first channel and the second channel.

12. The EV of claim 11, wherein the second electric heater is a positive temperature coefficient (PTC) heater.

13. The EV of claim 12, wherein the PCM is contained in a vessel that surrounds the PTC heater.

14. The EV of claim 13, wherein the electric heater is a positive temperature coefficient (PTC) heater and is powered by the battery.

15. The EV of claim 13, wherein the vessel has a rectangular cross-sectional shape.

16. The EV of claim 13, wherein the airflow regulating device is a blend door configured to shift between a first position in which more of the air is directed to the first channel than the second channel, and a second position in which more of the air is directed to the second channel than the first channel.

17. The EV of claim 16, wherein the blend door is in the first position when the EV is charging at an electric outlet and when the heat stored in the PCM is depleted.

18. The EV of claim 11, wherein the EV is a plug-in hybrid electric vehicle (PHEV).

* * * * *